(12) United States Patent
Gesuita et al.

(10) Patent No.: US 10,173,285 B2
(45) Date of Patent: Jan. 8, 2019

(54) LASER CUTTING HEAD FOR MACHINE TOOL

(71) Applicant: SALVAGNINI ITALIA S.P.A., Sarego (IT)

(72) Inventors: Enzo Gesuita, Selvazzano Dentro (IT); Riccardo Manzo, Grisignano di Zocco (IT); Angelo Granziero, Orgiano (IT)

(73) Assignee: Salvagnini Italia S.p.A. (IT)

( * ) Notice: Subject to any disclaimer, the term of this patent is extended or adjusted under 35 U.S.C. 154(b) by 176 days.

(21) Appl. No.: 15/036,197

(22) PCT Filed: Nov. 20, 2014

(86) PCT No.: PCT/EP2014/075209
§ 371 (c)(1),
(2) Date: May 12, 2016

(87) PCT Pub. No.: WO2015/075152
PCT Pub. Date: May 28, 2015

(65) Prior Publication Data
US 2016/0288267 A1    Oct. 6, 2016

(30) Foreign Application Priority Data
Nov. 22, 2013 (EP) .................................. 13194090

(51) Int. Cl.
*B23K 26/02* (2014.01)
*B23K 26/064* (2014.01)
*B23K 26/38* (2014.01)
*B23K 26/046* (2014.01)
*B23K 26/06* (2014.01)
(Continued)

(52) U.S. Cl.
CPC ............ *B23K 26/38* (2013.01); *B23K 26/046* (2013.01); *B23K 26/0648* (2013.01); *B23K 26/1462* (2015.10); *B23K 26/703* (2015.10); *B23K 26/707* (2015.10)

(58) Field of Classification Search
CPC .......................................... B23K 26/02–26/16
USPC ............................ 219/121.6–121.75, 121.84
See application file for complete search history.

(56) References Cited

U.S. PATENT DOCUMENTS

| | | | |
|---|---|---|---|
| 4,324,972 | A | 4/1982 | Furrer et al. |
| 6,198,579 | B1 | 3/2001 | Rupp |
| 2008/0030823 | A1 | 2/2008 | Shida et al. |

(Continued)

FOREIGN PATENT DOCUMENTS

| | | |
|---|---|---|
| JP | 2012091191 A | 5/2012 |
| WO | 2012157355 A1 | 11/2012 |

*Primary Examiner* — Michael Laflame, Jr.
(74) *Attorney, Agent, or Firm* — Laubscher & Laubscher, P.C.

(57) ABSTRACT

A laser cutting head powered by a laser emission apparatus includes a collimation device to collimate a laser beam coming from the laser emission apparatus and a focusing lens which focuses a collimated laser beam from the collimation device. The lens is supported in a casing and is movable along an adjustment direction to change a focal point of the laser beam. A cooling unit is connected with the casing and includes at least one Peltier cell and a heat dissipation element. A thermal conductive element connects a support for the lens with the cooling unit to extract heat generated by the laser beam passing through the lens by thermal conduction from the support and from the lens.

26 Claims, 8 Drawing Sheets

(51) Int. Cl.
 *B23K 26/14* (2014.01)
 *B23K 26/70* (2014.01)

(56) References Cited

U.S. PATENT DOCUMENTS

2010/0196716 A1* 8/2010 Ohta .................. C09K 5/14
 428/408
2014/0072003 A1* 3/2014 Matsumoto ........ B23K 26/0648
 372/26

\* cited by examiner

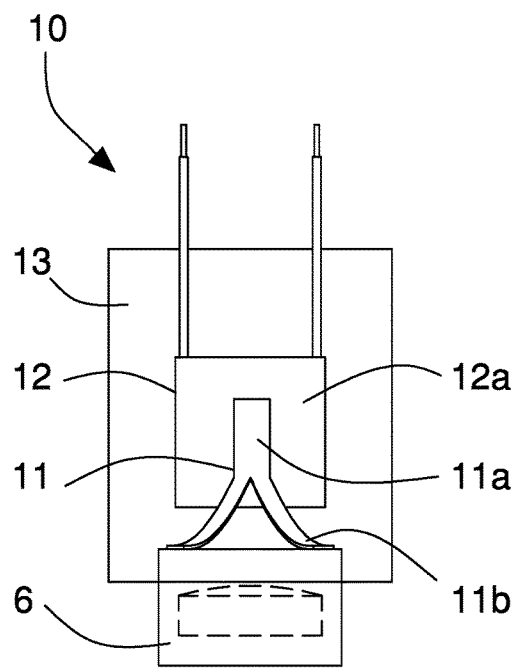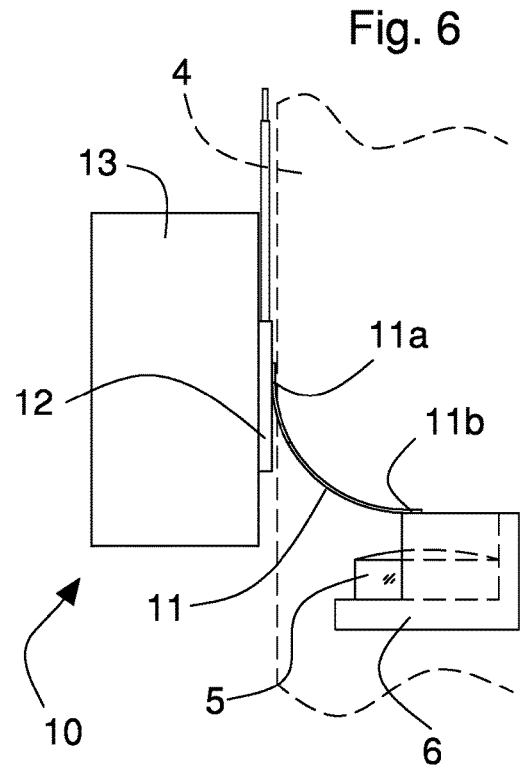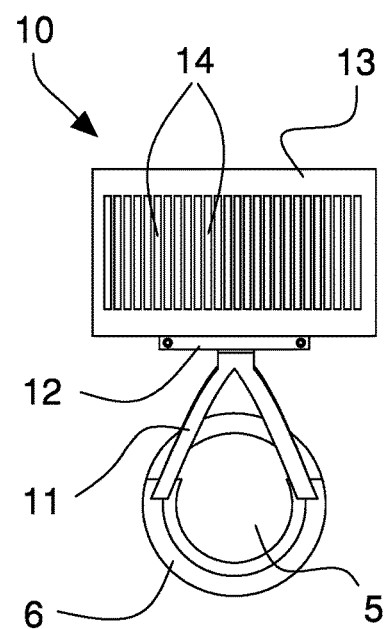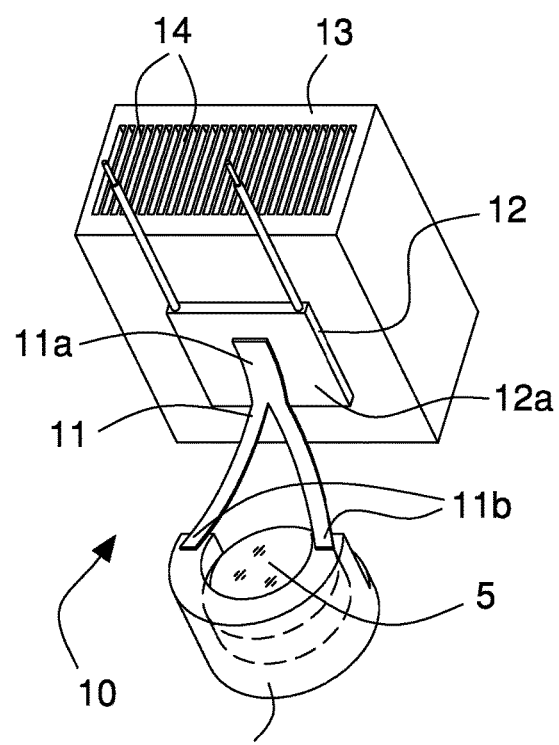

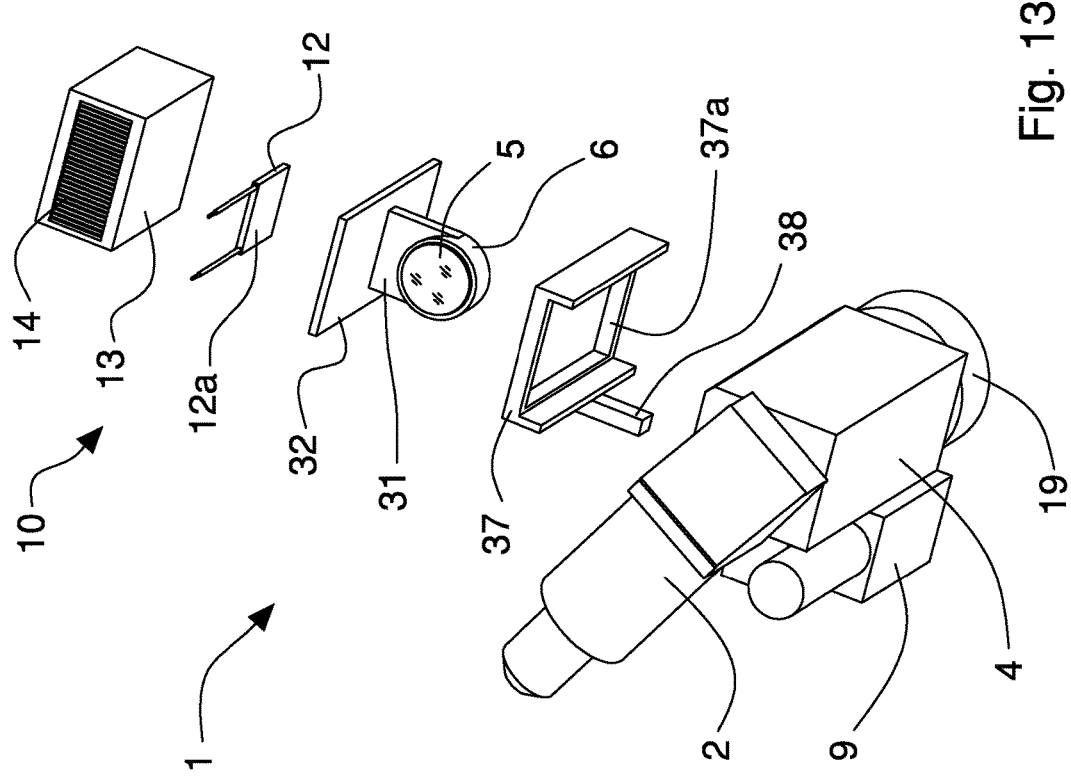
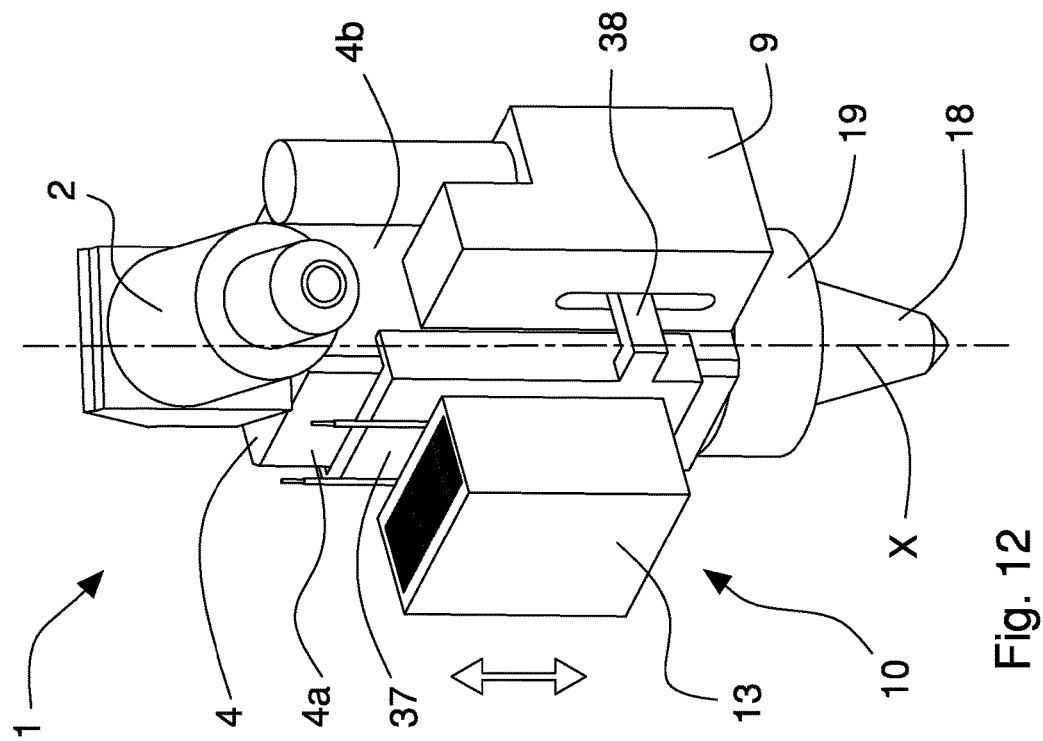

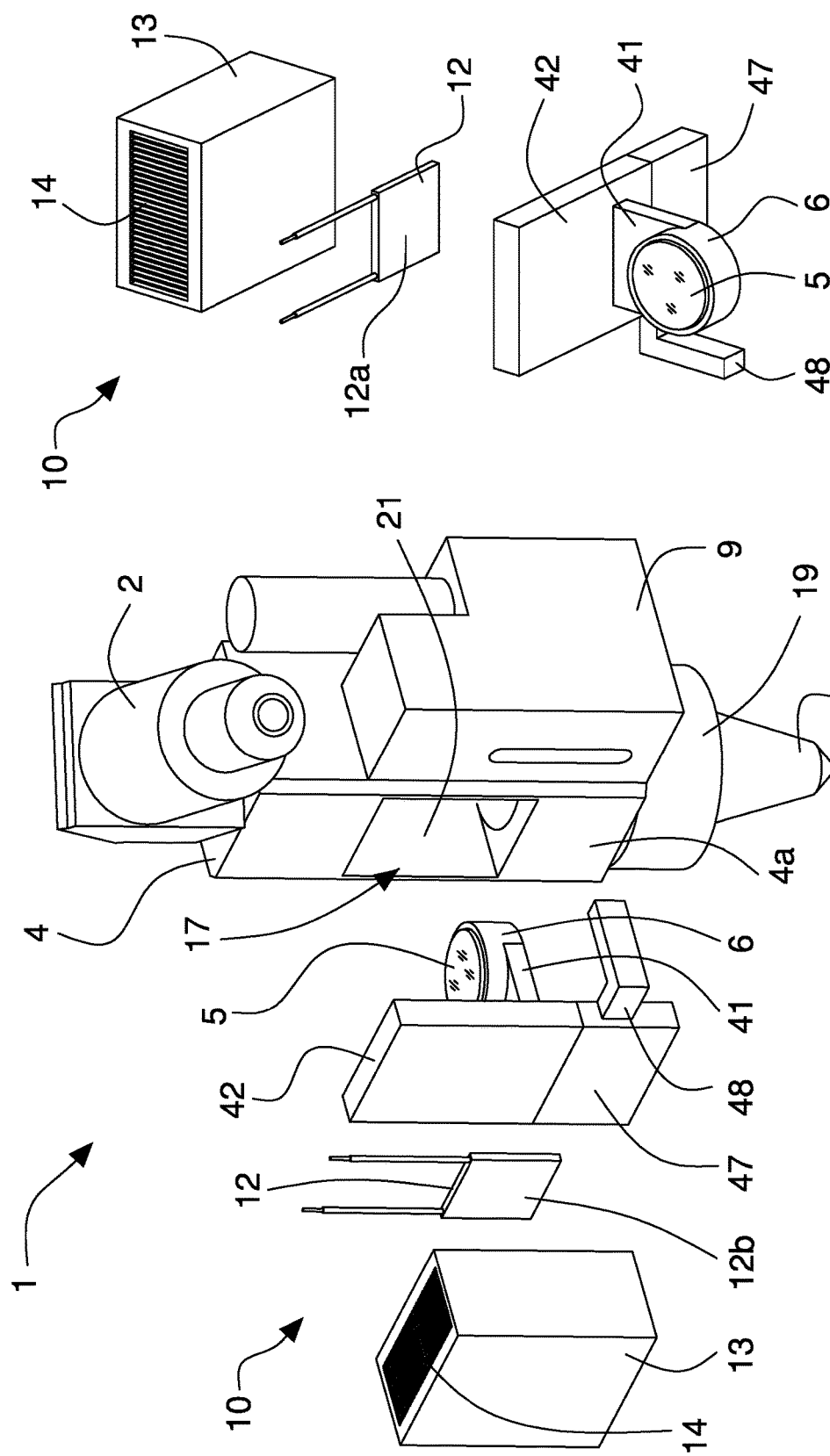

LASER CUTTING HEAD FOR MACHINE TOOL

This application is a § 371 National Stage Entry of PCT/EP2014/075209 filed Nov. 20, 2014. PCT/EP2014/075209 claims priority to EP Application No. EP13194090.0 filed Nov. 22, 2013. The entire content of these applications are incorporated herein by reference.

BACKGROUND OF THE INVENTION

The present invention relates to laser cutting devices for cutting machine tools and in particular relates to a laser cutting head to be used in a fiber optic laser cutting system in a cutting/punching machine tool for sheet metal.

DESCRIPTION OF RELATED ART

The use of laser systems for cutting, engraving and welding parts is well known and widely diffused in the field of machine tools for processing metal sheets and plates.

A laser device emits a coherent, monochrome ray of light, concentrated in a rectilinear beam having extremely high luminosity (brilliance), by means of a stimulated emission process. The possibility of concentrating a large amount of energy in a very small point enables laser devices to cut, engrave and weld metals. The cutting of metallic material typically occurs by vaporization and, particularly, by fusion. In this last case the laser beam melts a small point of the metal and the molten metal (dross) is removed by a blast or jet of gas.

Different types of laser source can be used to generate a light beam suitable for cutting metal. Typically, gas (dioxide, carbon monoxide, CO2) and solid-state (diode, doped glass, fiber) lasers are used.

In machine tools, due to the high energy levels required to cut sheet metal, and particularly thick sheet metal, dimensions and weight of the laser emission apparatus are such as to prevent them from being positioned on the machine. The laser beam is focused on the workpieces by a laser cutting head, or focusing head, that is connected to the emission apparatus by an optical chain (in CO2 lasers) or a transmission fiber (optical fiber, for example in YAG diode lasers). Because of its reduced dimensions and weight, the laser cutting head can, in fact, be moved with precision and speed by the machine tool in order to cut the workpiece.

In so-called fiber laser cutting systems, where a cable of optical fiber is used to transport the laser beam to the cutting head, the latter typically comprises an optical collimator which converges the light beam leaving the optical fiber on a focusing unit capable of focusing the collimated laser beam on the workpiece to be cut.

The focused laser beam leaves the focusing head through a cutting nozzle which concentrates the blast or jet of gas used to remove the dross generated by the fusion of the metal and limits the probability of the dross reaching the focusing unit. The focusing unit allows concentrating the laser beam, i.e. positioning the focal point or focus thereof on a given point on the surface of the workpiece to cut or immediately underneath this surface.

Correct positioning of the focal point is necessary to concentrate the full power of the laser beam and correctly cut the material.

The focusing unit typically comprises a focusing lens mounted on a lens-holder slide or carriage that is movable along an adjustment direction that is parallel to the direction of the laser beam so that the latter can be focused. More precisely, the lens-holder slide is moved by a respective actuator which is controlled according to a distance between the cutting head and the surface of the workpiece, said distance being measured by a suitable sensor that is mounted on the cutting head. The surface of the workpiece (a large sheet of metal, for example) is, in fact, generally irregular, not flat, curved.

The focusing lens and the relative lens-holder slide are housed inside a hermetically closed container or casing so as to prevent the entry of contaminating and extraneous elements that could dirty the lens and thus alters the optical characteristics thereof.

Cooling systems are provided to cool the cutting head and, in particular, the focusing lens.

A small fraction of the energy of the laser beam that crosses the lenses is, in fact, absorbed and transformed into heat for different causes, principally because of the non-absolute transparency of the optics (coating and substrate). The heat generated by a prolonged use causes a temperature rise of the entire head and, in particular, of the focusing lens. This temperature increase causes a variation in the refraction index of the lens itself and thus a shift of the focus. This phenomenon, commonly referred to as "thermal focus shift", makes impossible for the cutting system to focus the laser beam in the desired optimal point on the surface of the workpiece, and determines a consequent deterioration in the cutting characteristics to the point of it being impossible to make the cut at all.

The temperature increase may also damage the protective layer that is generally provided on the surfaces of the lenses and thus causes a further variation of the optical characteristics of the lenses.

To solve this problem, there are known cooling systems that introduce gas (typically nitrogen) into the focusing head at a controlled temperature so that it flows across the focusing lens, thus cooling said lens.

BRIEF SUMMARY OF THE INVENTION

External cooling of the casing containing the focusing unit is not, in fact, sufficient to guarantee an adequate cooling of the focusing lens.

However cooling systems using a gas flow have the drawback of requiring the use of expensive gases that are devoid of contaminating elements. Contaminating or extraneous particles or elements contained in the gas may deposit on the focusing lens, causing not only a variation of the refraction index of the optics, but also an absorption of the energy of the laser beam and hence a reduction in the power available for cutting.

Moreover, such systems are quite complex and expensive to be manufactured and require a periodical maintenance.

JP 2012091191 discloses a laser machining apparatus that includes a laser emitting unit provided with laser generating means for generating a laser beam, a laser head provided with galvano scanners for emitting the laser beam outputted from the laser emitting unit to a workpiece, and an optical fiber cable for transmitting the laser beam from the laser emitting unit to the laser head. The optical fiber cable is provided with a head connector attached detachably on the laser head. The head connector is provided with a beam expander that includes a diffusion lens for diffusing the laser beam emitted from the optical fiber cable and a convergent lens for making the laser beam emitted from the diffusion lens converge as a parallel beam.

US 20080030823 discloses a method and device for focusing a laser beam outputted from a laser oscillator through a lens and irradiating an object. The device comprises mirrors for reflecting the laser beam outputted from the laser oscillator and a condenser lens for focusing the laser beam and irradiating the object. Because a focal distance of the condenser lens can change due to a change in temperature, when irradiation of the laser beam is restarted after the irradiation has stopped, the lens tube containing the condenser lens is heated or cooled by a temperature control device provided with a Peltier device.

U.S. Pat. No. 6,198,579 discloses an objective with optical elements, particularly lens, for a projection exposure device used in semiconductor microlithography. The objective is provided with a cooling device for the correction of image errors due to the heating effects in the optical elements, in particular due to non-rotationally-symmetrical temperature distributions in the optical elements. The cooling device comprises several Peltier elements that are arranged on at least one of the optical elements, distributed over its periphery, and are differently driven electrically in order to act on the temperature distribution in the optical element.

An object of the present invention is to improve the existing laser cutting heads for cutting machine tools and in particular the cutting heads for fiber optic laser cutting systems.

Another object is to provide a laser cutting head provided with a cooling system capable of ensuring efficient and optimal cooling of the focusing means.

A further object is to obtain a laser cutting head provided with a cooling system having a simple and economic construction and effective and reliable operation.

Still another object is to provide a laser cutting head allowing maintaining the focus of the laser beam in a fixed position, even after prolonged and intensive use.

In a first aspect of the invention a laser cutting head is provided as defined in claim 1.

The laser cutting head according to this aspect of the invention can be fed by a laser emission apparatus using optical transmission means and can be associated with a cutting machine tool. The laser cutting head comprises collimation means to collimate a laser beam generated by the emission apparatus, focusing means to focus the collimated laser beam leaving the collimation means and a casing to house and contain the focusing means provided with a focusing lens and with supporting means for housing the focusing lens and moving the latter along an adjustment direction in order to change the focal point of the laser beam emitted. The laser cutting head includes a cooling unit, which is externally associated to the casing and is provided with one or more Peltier cell and a heat dissipation element, and thermal conductive connecting means arranged for connecting the supporting means to the cooling unit in order to rigidly link said supporting means and said cooling unit and to extract by heat conduction from the supporting means and the focusing lens the heat generated by the laser beam when passing through the focusing lens. The supporting means and the thermal conductive connecting means are made of a thermal conductivity material, preferably a high thermal conductivity material.

The laser cutting head further includes a moving element that supports the thermal conductive connecting means and the cooling unit and is slidably coupled to an external wall of the casing, movable along the adjustment direction so as to move the supporting means and the focusing means for adjusting the focal point of the laser beam.

The thermal conductive connecting means comprises a first connecting element and a second connecting element, both of which are made of a thermal conductivity material, wherein the first connecting element has a first end fixed to, and holding, the supporting means and a second end fixed to the second connecting element, which is connected to the cold side of the Peltier cell. The hot side of the Peltier cell is connected to the heat dissipation element.

During the operation of the laser cutting head, the heat generated in the focusing lens by the passage of the laser beam is transferred and transmitted by the supporting means and thermal conductive connecting means to the Peltier cell, which is suitably powered and controlled by direct or PWM (pulse-width modulation) electric current and transfers this heat to the heat dissipation element. The Peltier cell by removing heat allows controlling the temperature of the focusing lens and, in particular, prevents the latter from overheating, which would result in a variation in its refraction index and thus an uncontrolled focal shift.

To be noted that the thermal conductive connecting means and the moving element make possible both to control the temperature of the focusing lens (by means of the Peltier cell) and to move the supporting means and the focusing lens (together with the cooling unit) along the adjustment direction in order to adjust the focal point of the laser beam.

In a second aspect of the invention a laser cutting head is provided as defined in claim 13.

The laser cutting head according to this aspect of the invention can be fed by a laser emission apparatus using optical transmission means and can be associated with a cutting machine tool. The laser cutting head comprises collimation means to collimate a laser beam generated by the emission apparatus, focusing means to focus the collimated laser beam leaving the collimation means and a casing to house and contain the focusing means provided with a focusing lens and with supporting means for housing the focusing lens and move the latter along an adjustment direction in order to change the focal point of the laser beam emitted. The laser cutting head comprises a cooling unit, which is externally fixed to the casing and provided with one or more Peltier cell, and a heat dissipation element and thermal conductive connecting means arranged for connecting the supporting means to the cooling unit in order to extract by heat conduction from the supporting means and the focusing lens the heat generated by the laser beam when passing through the focusing lens.

For this purpose the supporting means and the thermal conductive connecting means are made of a thermal conductivity material, preferably a high thermal conductivity material.

The thermal conductive connecting means comprises at least one flexible thermal conductive element that is connected to the cold side of the Peltier cell, whereas the heat dissipation element is connected to the hot side of the Peltier cell.

During the operation of the laser cutting head, the heat generated in the focusing lens by the passage of the laser beam is transferred and transmitted by the supporting element and thermal conductive connecting means to the Peltier cell, which is suitably powered and controlled by direct or PWM (pulse-width modulation) electric current and transfers this heat to the heat dissipation element. The Peltier cell, which works as a heat pump, by removing heat allows the temperature of the focusing lens to be controlled and, in particular, prevents the latter from overheating, which would result in a variation in its refraction index and thus an uncontrolled focal shift.

To be noted that thanks to the flexibility of the thermal conductive connecting elements, during the operation the supporting means and the focusing lens can be effectively cooled by the Peltier cell while they freely move along the adjustment direction inside the casing for adjusting the focal point of the laser beam.

The thermal efficiency of the cooling system of the laser cutting head disclosed in the present invention (cooling unit, thermal conductive connecting means and supporting means) is comparable to that of the known gas cooling systems which remove heat from the lens by convection.

Thanks to the peculiar cooling system, the laser cutting head of the invention prevents the phenomenon of "thermal focus shift" of the focusing lens during the operation, even prolonged and intensive, allowing the laser beam to be focused on the desired optimal point with respect to the surface of the workpiece, ensuring efficient and accurate cutting. Temperature control and adjustment also prevents damage to the protective superficial layer of the focusing lens.

BRIEF DESCRIPTION OF THE FIGURES

The present invention can be better understood and implemented with reference to the attached drawings that illustrate embodiments of the invention by way of non-limiting example, in which:

FIG. 4 is a perspective view of the cooling unit associated with the focusing means and supporting means of the laser cutting head of FIG. 1;

FIG. 5 is a front view of the cooling unit, focusing means and supporting means of FIG. 4;

FIG. 6 is a side view of the cooling unit, focusing means and supporting means of FIG. 4;

FIG. 7 is a top plan view of the cooling unit, focusing means and supporting means of FIG. 4;

FIG. 12 is a perspective view of a second embodiment of the laser cutting head of the invention;

FIG. 13 is an exploded view of the laser cutting head of FIG. 12;

FIG. 16 is an exploded view of the laser cutting head of FIG. 15;

FIG. 17 is a perspective view of the cooling unit associated with the focusing means and supporting means of the laser cutting head of FIG. 15;

DETAILED DESCRIPTION OF THE INVENTION

Figure 1:
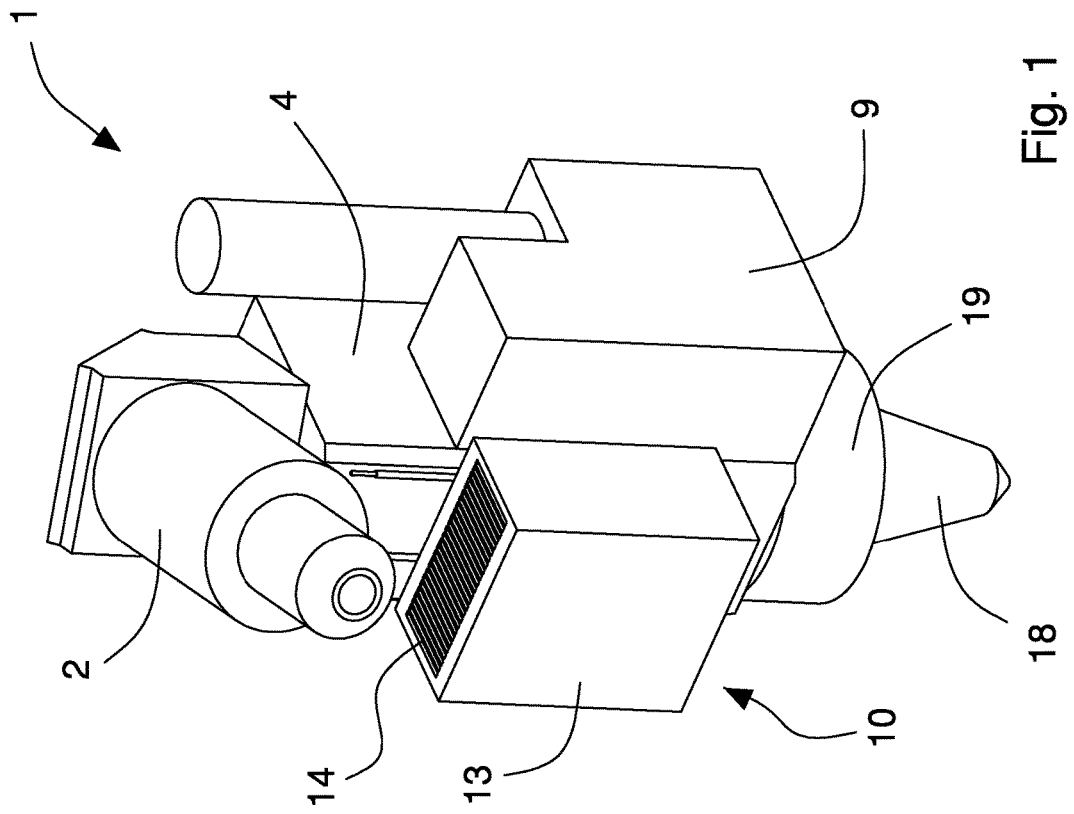
FIG. 1 is a perspective view of a first embodiment of the laser cutting head of the invention.
Figure 2:
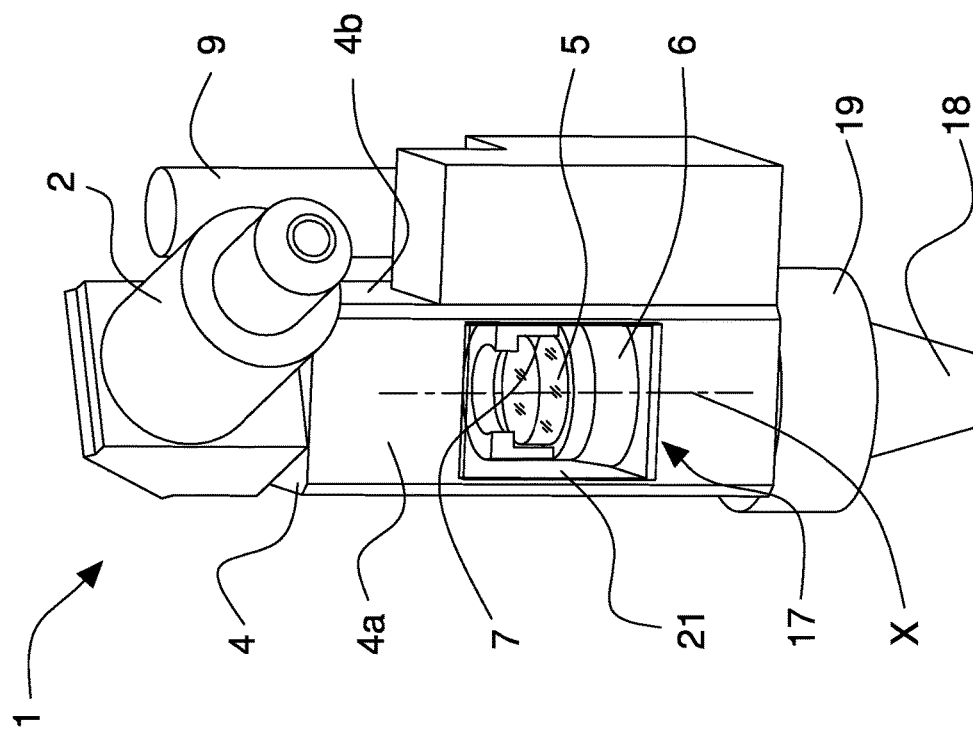
FIG. 2 is a view of the laser cutting head of FIG. 1, without a cooling unit, for better showing focusing means.

With reference to FIGS. 1 to 7, a laser cutting head 1 is shown according to a first embodiment of the invention, which is arranged to be powered by a laser emission apparatus, of a known type and not shown in the figures, by means of optical transmission means and associable with a cutting machine tool. In particular, the emission apparatus is of solid-state laser stimulated emission type, and the optical transmission means comprises an optical fiber cable suitable for conveying the laser beam generated by the emission apparatus to the laser cutting head 1.

The laser cutting head 1 comprises collimation means 2 for collimating the laser beam generated by the laser emission apparatus, focusing means 5 for focusing the collimated laser beam leaving the collimation means 2 and a casing 4 for containing and housing the focusing means 5.

The laser cutting head 1 also comprises a cutting nozzle 18, that is fixed to the casing 4 by an optical centering ring-nut 19 and through which the focused laser beam comes out. The cutting nozzle 18 concentrates a blast or jet of gas for removing the dross generated by the fusion of the workpiece and at the same time limits the probability of this dross reaching the inside of the casing 4 and the focusing means 5.

The collimation means 2 are of known type and comprises a set of lenses and a mirror capable of converging and collimating the laser beam coming from the optical fiber in a rectilinear laser beam directed towards the focusing means 5.

The focusing means comprises at least one focusing lens 5.

The laser cutting head 1 further includes supporting means 6 that is arranged to receive and hold the focusing lens 5 and is movable along an adjustment direction X inside the casing 4 to allow adjusting the focal point or focus of the laser beam coming out from the focusing lens 5.

The supporting means includes a supporting element 6, which substantially acts as a carriage or slide for the focusing lens 5 and is housed inside a cavity 21 of the casing 4 wherein is slidably moved along the adjustment direction X by driving means 9.

The driving means 9 includes, for example, a linear electric actuator or a recirculating ball screw operated by a rotary electric motor and coupled to the relative lead screw that is connected to the supporting element 6. The driving means 9 is fixed to the casing 4 and is connected to the supporting element 6 through an opening carried out in a side wall 4b of the casing 4.

The supporting element 6 comprises a seat 7 suitable for receiving and locking the focusing lens 5.

The laser cutting head 1 further comprises a cooling unit 10, which is externally fixed to the casing 4 and thermal conductive connecting means 11 arranged for connecting the supporting means 6 to the cooling unit 10 so as to extract by heat conduction from the supporting element 6 and the focusing lens 5 the heat that is generated by the laser beam when the latter passes through said focusing lens 5. For this purpose, the supporting element 6 is made of a thermal conductivity material, preferably a high thermal conductivity material such as aluminium alloy or brass, in order to allow the heat to be transferred from the focusing lens 5.

The thermal conductive connecting means 11 comprises at least one flexible thermal conductive element made of high thermal conductivity material, for example a braided copper tape and/or graphite-coated tape.

In the embodiment shown in the figures, the flexible thermal conductive element 11 comprises a main portion 11a, which is fixed to the cooling unit 10 and from which two elongated portions 11b depart that are secured to opposite sides of supporting element 6.

In an embodiment that is not shown, the flexible thermal conductive element 11 may comprise a single elongated portion 11b in addition to the main portion 11a.

To be noted that the flexibility of the thermal conductive element 11 in no way hinders the movement of the supporting element 6 along the adjustment direction X during operation of the laser cutting head 1 while the thermal conductivity material of the thermal conductive element 11 ensure an optimal heat extraction from the focusing lens 5.

The cooling unit 10 comprises at least one Peltier cell 12 and a heat dissipation element 13. The flexible thermal conductive device 11 is connected to the cold side 12a of the Peltier cell 12, whereas the heat dissipation element 13 is connected to the hot side 12b of the Peltier cell 12.

The Peltier cell is a thermoelectric device that acts as a solid-state heat pump and typically has the appearance of a thin plate: one of the two sides or faces of the plate absorbs heat while the other emits the heat. The direction in which the heat is transferred depends on the direction of the direct current applied at the ends of this plate. More precisely, a Peltier cell is composed of a plurality of Peltier junctions arranged in series to form a thin plate. The junction is formed of two doped semi-conductors, one N-type and one P-type, connected together by two opposing sheets of copper that form the outside faces or sides of the plate. By applying a direct electric current of opposite voltage to the semiconductor materials it is possible to cool one side or face of the plate and at the same time to heat the opposite side, thus transferring thermal energy between the two sides of the plate. By inverting the voltage of the electric current supplied to the semi-conductor materials it is possible to invert the thermal energy transfer.

The Peltier cell 12 used in the cooling unit 10 is of a known type.

The laser head 1 comprises a cover 16 made of thermal conductivity material, preferably a high thermal conductivity material such as aluminium alloy or brass, to close an opening 17 of the casing 4 that gives access to the cavity 21 in which the supporting element 6 and the focusing lens 5 move.

Figure 3:
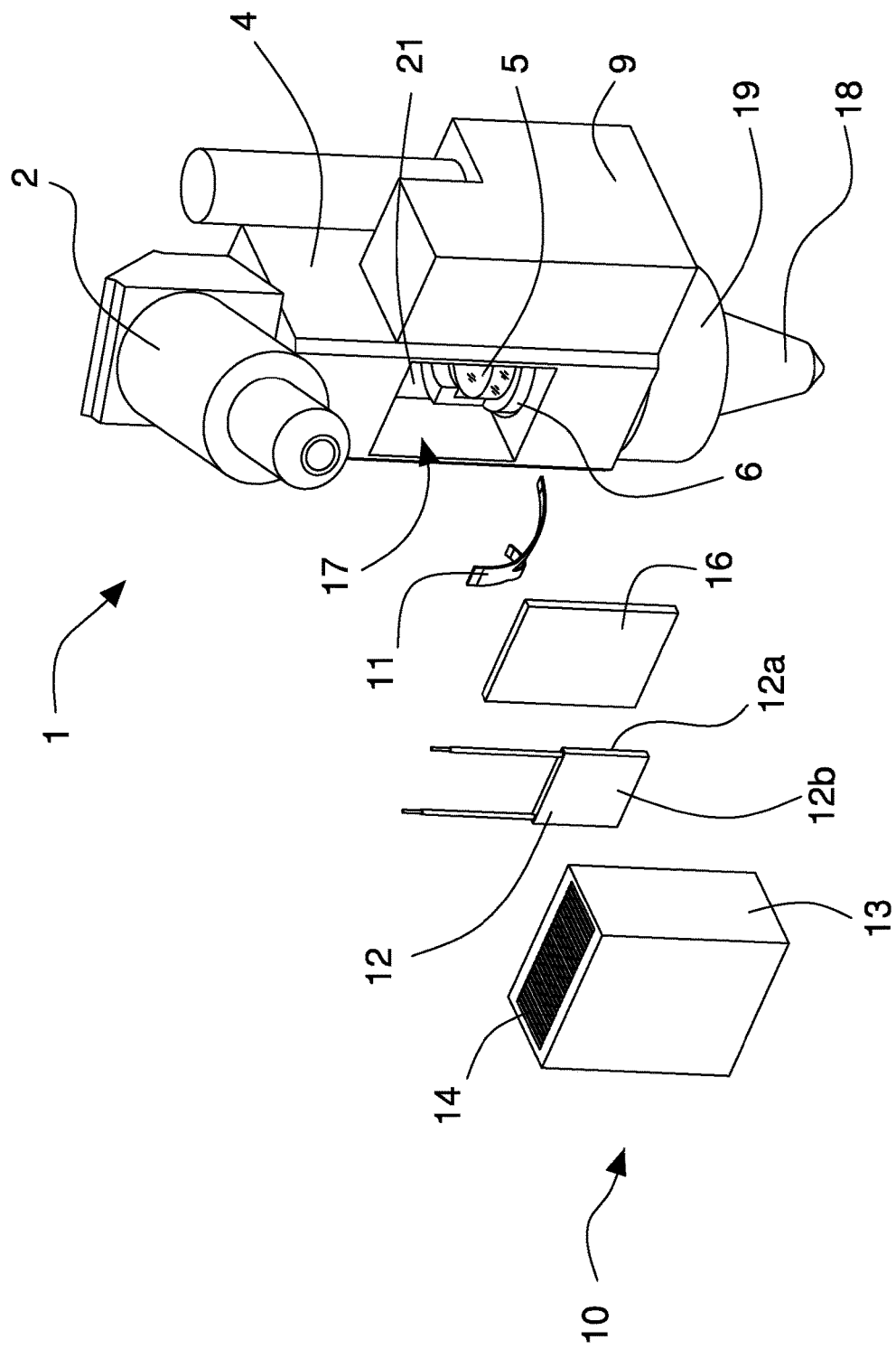
FIG. 3 is an exploded view of the laser cutting head of FIG. 1.
Figure 9:
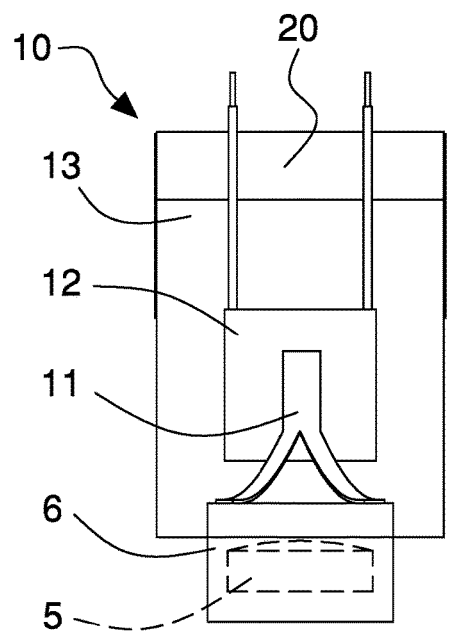
FIG. 9 is a front view of the cooling unit, focusing means and supporting means of FIG. 8.
Figure 10:
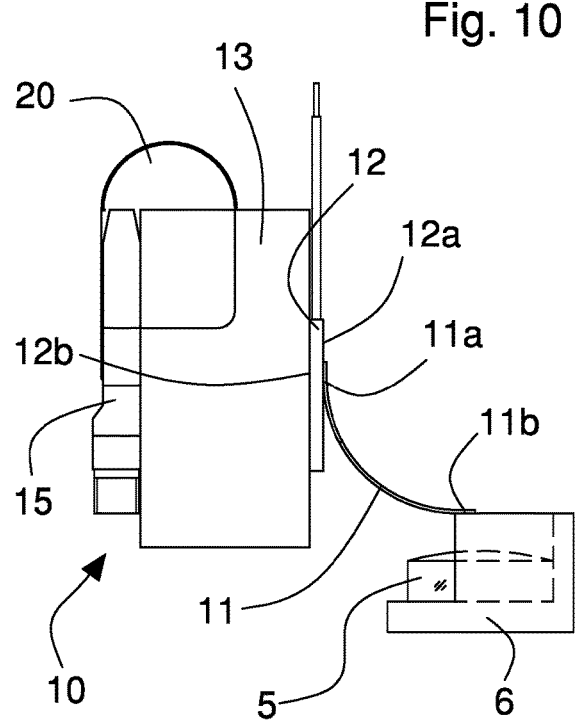
FIG. 10 is a side view of the cooling unit, focusing means and supporting means of FIG. 8.
Figure 11:
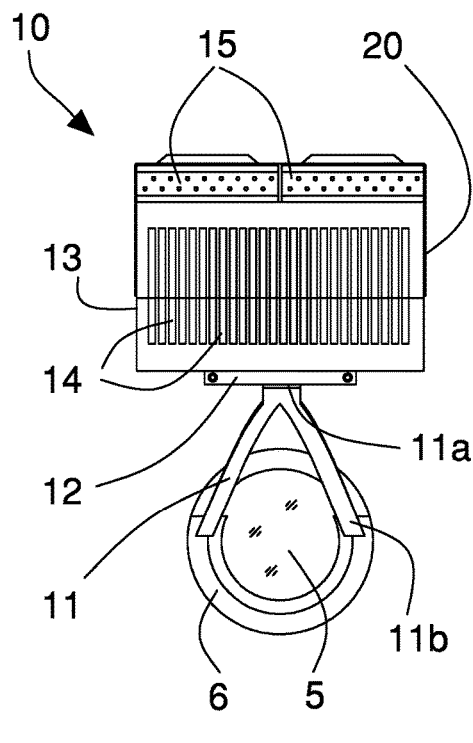
FIG. 11 is a top plan view of the cooling unit, focusing means and supporting means of FIG. 8.
Figure 8:
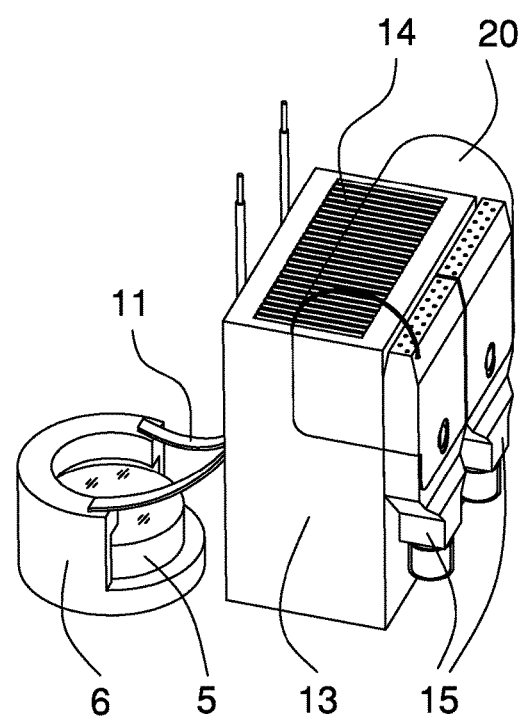
FIG. 8 is a perspective view of a variant of the cooling unit of the laser cutting head of the invention associated with focusing means and supporting means.

In the embodiment shown in FIG. 3, the cold side 12a of the Peltier cell 12 is fixed to an outer wall of the cover 16 and the flexible thermal conductive element 11 is fixed to the inner wall of the cover 16.

Alternatively, the flexible thermal conductive element 11 can be directly fixed to the cold side 12a of the Peltier cell through a corresponding opening provided in the cover 16 (FIGS. 4-7).

Still alternatively, the cold side 12a of the Peltier cell 12 can be fixed to an external wall 4a, for example a front wall, of the casing 4 and the flexible thermal conductive element 11 can be directly fixed to the cold side 12a through a corresponding opening which is provided in the casing 4 and gives access to the cavity 21.

In a version of the cutting head that is not shown, the cooling unit 10 comprises a plurality of Peltier cells 12 arranged in series and/or parallel.

The heat dissipation element 13 comprises a body made of high thermal conductivity material, such as aluminium alloy, provided with a plurality of cooling ducts 14 that allow the passage of air, in particular by convection, in order to cool the body itself. In the illustrated embodiment, the heat dissipation element 13 has a parallelepiped shape and has a plurality of cooling ducts 14 arranged side by side and extending along a longitudinal direction, for example parallel to the adjustment direction X.

The hot side 12b of the Peltier cell 12 is fixed to a rear wall of the heat dissipation element 13.

Thermally conductive adhesives can be used to fix the thermal conductive connecting means 11 to the supporting means 6 and to the Peltier cell 12. More precisely, thermally conductive adhesives are used to fix the thermal conductive connecting means 11 to the supporting element 6 and to the cover 16 and/or to the cold side 12a of the Peltier cell and to fix the opposite sides 12a, 12b of the Peltier cell to the cover 16 and to the heat dissipation element 13.

FIGS. 8 to 11 show a version of the cooling unit 10 which comprises intake means 15 arranged for introducing a cooling fluid inside said cooling ducts 14 in order to increase the heat exchange (forced convection) and to cool the hot side 12b of the Peltier cell more quickly and effectively. The intake means 15 includes, for instance, a couple of nozzles supplied with compressed air and capable of introducing said compressed air into the cooling ducts 14. A diverter element 20 allows the flow of compressed air coming out from the nozzles 15 to be directed in the cooling ducts 14 so that the cooling fluid, i.e. the compressed air, leaves the heat exchange element 13 directed toward the workpiece.

During the operation of the laser cutting head 1 of the invention, the heat generated in the focusing lens 5 by the passage of the laser beam coming out from the collimation means 3 (heat generated by the non-absolute transparency of the lens) is transferred and transmitted to the supporting element 6, to the thermal conductive connecting means 11 and to the cold side 12a of the Peltier cell 12. In this way, during the operation of the laser cutting head 1 the heat is transferred from the focusing lens 5 to the Peltier cell 12, which transfer the heat to the heat dissipation element 13 (fixed to the hot side 12b of said Peltier cell 12).

To be noted that during the operation of the laser cutting head 1 the focusing lens 5 transfers heat to the supporting element 6, which transfers heat to the flexible thermal conductive element 11. The heat extraction operated by the Peltier cell 12, which works as a heat pump, allows to control the temperature of the focusing lens 5 and in particular to prevent the overheating of the lens 5 with consequent variation of the lens refractive index and hence a focus shift.

By adjusting the intensity and voltage of the direct electrical current, which powers the Peltier cell 12, it is possible to control the temperature of the focusing lens 5 during the operation in an accurate and reliable manner.

Thanks to the special cooling system, the laser cutting head 1 of the invention during operation, even long and intensive, allows to avoid thermal focus shift of the focusing lens 5 and therefore to focus the laser beam in the desired and optimal point with respect to the surface of the workpiece with cutting accuracy and efficiency.

The temperature control and adjustment allows avoiding damage of the protective superficial layer of the focusing lens 5.

To be noted that thanks to the flexibility of the thermal conductive connecting elements the supporting means and the focusing lens can be effectively cooled by the Peltier cell while they move along the adjustment direction inside the casing for adjusting the focal point of the laser beam.

The thermal efficiency of the cooling system of the laser cutting head disclosed in the present invention (cooling unit, thermal conductive connecting means and supporting means) is comparable to that of the known gas cooling systems which remove heat from the lens by convection.

Figure 14:
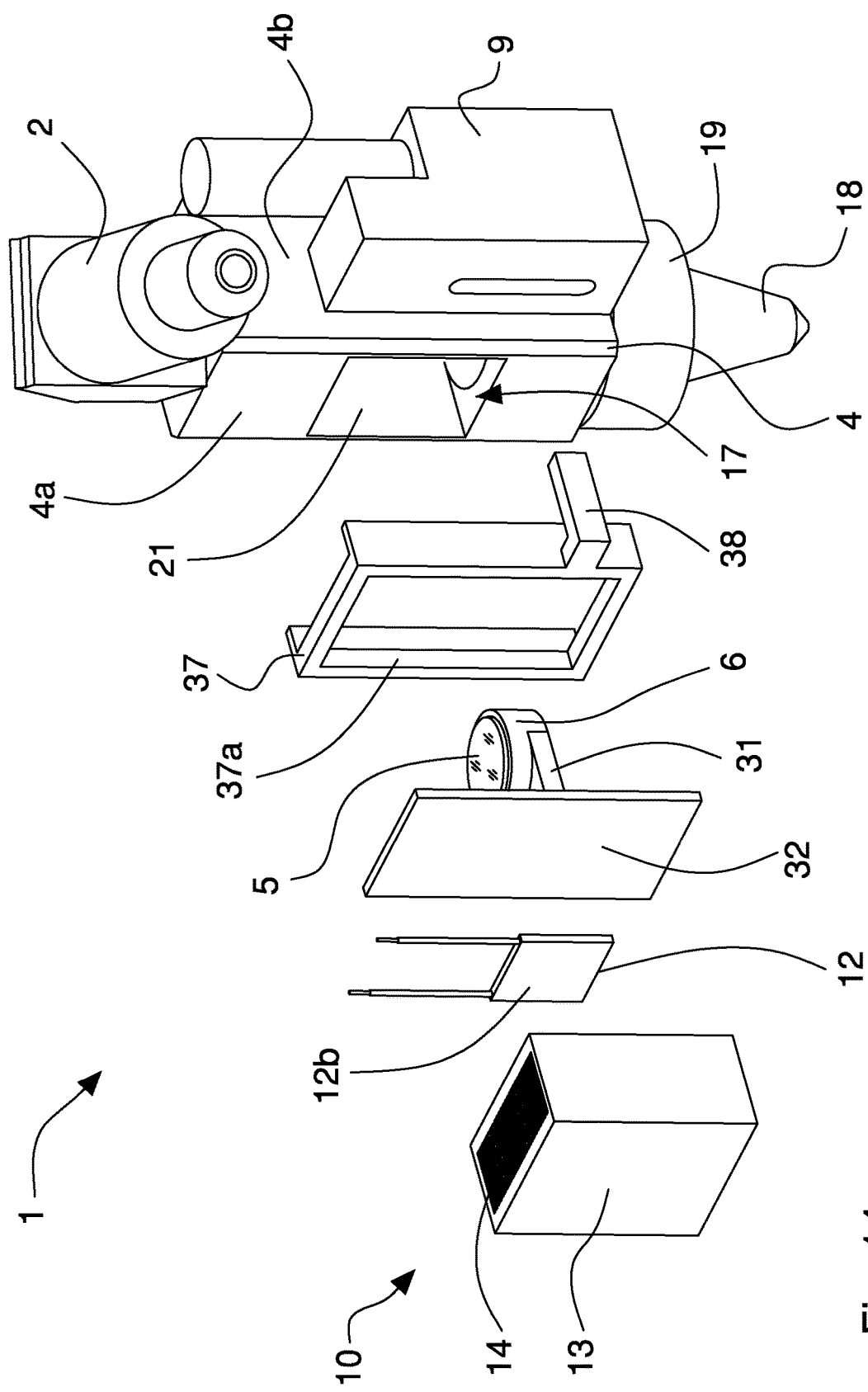
FIG. 14 is another exploded view of the laser cutting head of FIG. 12.

With reference to FIGS. 12 to 14, a laser cutting head 1 is shown according to a second embodiment of the invention, which is arranged to be powered by a laser emission apparatus by means of optical transmission means and is associable with a cutting machine tool.

The laser cutting head 1 comprises collimation means 2 for collimating the laser beam generated by the laser emission apparatus, focusing means 5 for focusing the collimated laser beam leaving the collimation means 2 and a casing 4 for containing and housing the focusing means 5.

The laser cutting head 1 also comprises a cutting nozzle 18, that is fixed to the casing 4 for example by a ring-nut 19 and through which the focused laser beam comes out.

The collimation means 2 are of known type and may comprise a set of lenses capable of converging and collimating the laser beam coming from the optical transmission means in a rectilinear laser beam. A mirror can be provided for redirecting the laser beam towards the focusing means 5 that comprises at least one focusing lens 5.

The laser cutting head 1 comprises supporting means 6 arranged for receiving and holding said focusing lens 5 within a cavity 21 of said casing 4 and movable along an adjustment direction X so as to change a focal point or focus of the said laser beam coming out from said focusing means 5.

The cavity 21 is provided with an accessing opening 17.

The supporting means includes a supporting element 6 that is provided with a seat 7 suitable for receiving and holding the focusing lens 5.

The laser cutting head 1 further includes a cooling unit 10, which is externally associated to the casing 4 and is provided with at least one Peltier cell 12 and a heat dissipation element 13, and thermal conductive connecting means 31 which is arranged for connecting the supporting means 6 to the cooling unit 10 so as to rigidly link said supporting means 6 and said cooling unit 10 and to extract by heat conduction from the supporting element 6 and the focusing lens 5 the heat that is generated by the laser beam passing through said focusing lens 5. For this purpose, the supporting element 6 is made of a thermal conductivity material, preferably a high thermal conductivity material such as aluminium alloy or brass.

The Peltier cell 12 comprises a cold side 12a that is connected to the thermal conductive connecting means 31, 32 and a hot side 12b that is connected to the heat dissipation element 13. The heat dissipation element 13 has a body made of high thermal conductivity material, such as aluminium alloy, and is provided with a plurality of cooling ducts 14 that allow the passage of air, in particular by natural or forced convection, to cool the body itself.

The cooling unit 10 may also comprise a plurality of Peltier cells 12 arranged in parallel and/or in series.

The laser cutting head 1 includes a moving element 37 that supports the thermal conductive connecting means 31 and/or the cooling unit 10 and is slidably coupled to an external wall 4a, for example the front wall, of the casing 4 and is movable along the adjustment direction X so as to move the supporting means 6 and the focusing means 5.

Driving means 9 is fixed to the casing 4 and coupled to the moving element 37 so as to move the latter along said adjustment direction X.

The thermal conductive connecting means comprises a first connecting element 31 and a second connecting element 32 both made of a thermal conductivity material, preferably a high thermal conductivity material such as aluminium alloy or brass. The first connecting element 31 is provided with a first end fixed to, and holding, the supporting element 6 and a second end fixed to the second connecting element 32, the latter being connected to the Peltier cell 12, in particular to a cold side 12a thereof.

The first connecting element 31 is shaped substantially as an elongated bracket or arm which is connected to the second connecting element 32, for example detachably by suitable fastening means. The first connecting element 31 and second connecting element 32 can be also made integral.

The second connecting element 32 has a flat shape with an inner surface to which the first connecting element 31 is fastened and an external surface which is connected to the cold side 12a of the Peltier cell 12. The flat shape and the dimensions of the second connecting element 32 allow an efficient and high thermal exchange between the thermal conductive connecting means 31, 32 (together with the supporting element 6 and the focusing lens 5) and the Peltier cell 12.

Thermally conductive adhesives can be used to mutually fix the external surface of the second connecting element 32 and the cold side 12a of the Peltier cell 12.

The moving element 37 is coupled to the second connecting element 32 so as to move the latter together with the first connecting element 31, the supporting element 6 and the focusing lens 5 and the cooling unit 10.

Alternatively, the moving element 37 can directly support the cooling unit 10 and the latter can support the supporting element 6 and the focusing lens 5 by means of the connecting elements 31, 32.

In the illustrated embodiment, the moving element 37 comprises a flat element that is slidably coupled to the external wall 4a, i.e. a front wall, of the casing 4 and is provided with a respective opening 37a that gives access to the cavity 21 of the casing 4. More precisely, the opening 37a of the moving element 37 allows the connecting elements 31, 32 to rigidly connect the cooling unit 10 to the supporting element 6.

The moving element 37 has a linking arm 38 that is coupled to the driving means 9. The latter is fixed to a side wall 4b of the casing 4 and includes for example, a linear electric actuator or a recirculating ball screw operated by a rotary electric motor and connected to the relative lead screw fastened to the linking arm 38.

During the operation of the laser cutting head 1 of the invention, the heat generated in the focusing lens 5 by the passage of the laser beam coming out from the collimation means 2 (heat generated by the non-absolute transparency of lens) is transferred and transmitted to the supporting element 6, to the thermal conductive connecting means 31, 32 and then to the cold side 12a of the Peltier cell 12. Then the Peltier cell 12 transfers the heat of the focusing lens to the heat dissipation element 13 that is fixed to the hot side 12b.

Hence the Peltier cell 12 allows controlling the temperature of the focusing lens 5 and in particular to prevent the overheating of the focusing lens 5 with consequent variation of the lens refractive index and hence a focus shift. By adjusting the intensity and voltage of the direct or PWD (pulse-width modulation) electrical current, which powers the Peltier cell 12, it is possible to control the temperature of the focusing lens 5 in an accurate and reliable manner.

Thanks to the special cooling system, the laser cutting head 1 of the invention during operation, even long and intensive, allows to avoid thermal focus shift of the focusing lens 5 and therefore to focus the laser beam in the desired and optimum point with respect to the surface of the work piece with cutting accuracy and efficiency.

The temperature control and adjustment can help to prevent damage of the protective superficial layer of the focusing lens 5.

It should be noted that the thermal conductive connecting means and the moving element make possible both to control the temperature of the focusing lens (by means of the Peltier cell) and to move the supporting means and the focusing lens along the adjustment direction in order to adjust the focal point of the laser beam.

Furthermore the connecting elements 31, 32 can be disconnected from the moving element 37 allowing to easily and quickly remove from the laser cutting head 1 both the cooling unit 10 and the supporting element 6 with the focusing lens 5, for maintenance and/or controls.

Figure 15:
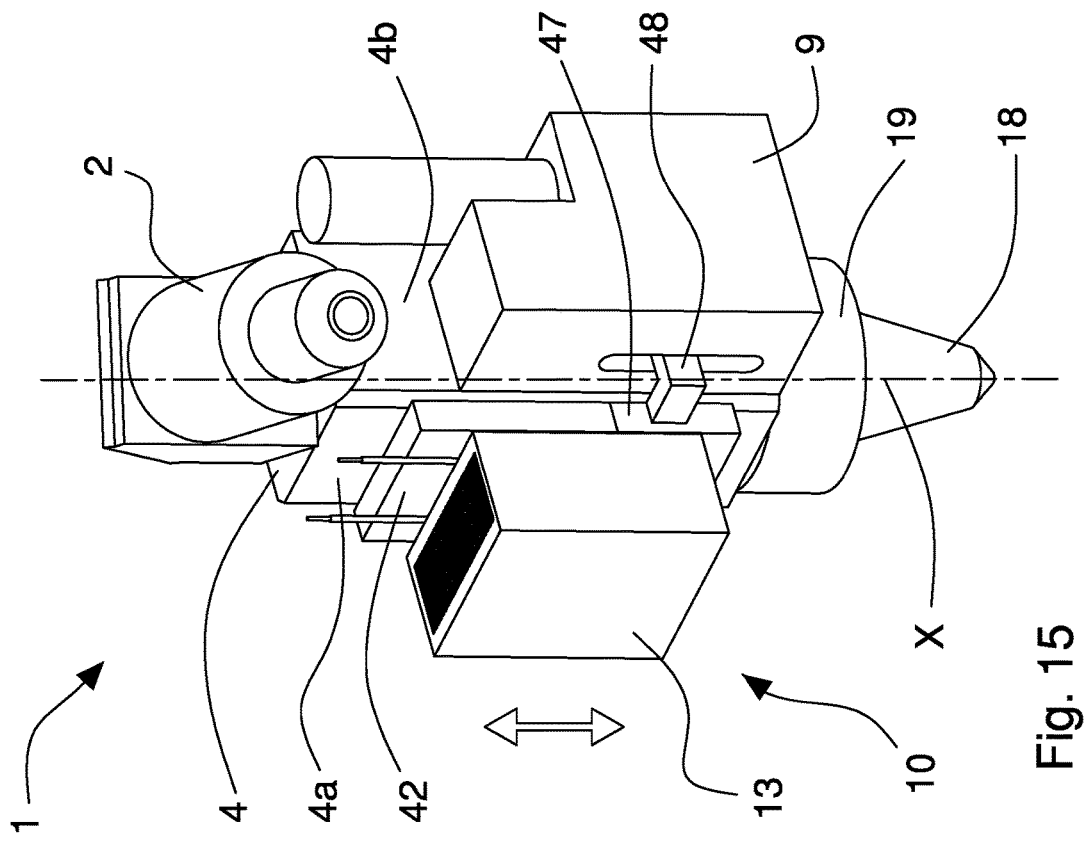
FIG. 15 a perspective view of a variant of the laser cutting head of FIG. 12.

FIGS. 15 to 17 show a variant of the laser cutting head 1, which differs from the second embodiment of FIGS. 12 to 14 and above described for the different thermal conductive connecting means 41, 42 and the moving element 47.

In this variant the second connecting element 42 of the thermal conductive connecting means and the moving element 47 are mutually fixed so as to form a flat shaped element of which an inner surface is coupled to the first connecting element 41 of the thermal conductive connecting means and an external surface is connected to the cold side 12*a* of the Peltier cell. The second connecting element 42 and the moving element 47 can be also made integral and in a high thermal conductivity material.

The moving element 47 has a linking arm 48 that is coupled to the driving means 9.

Figure 18:
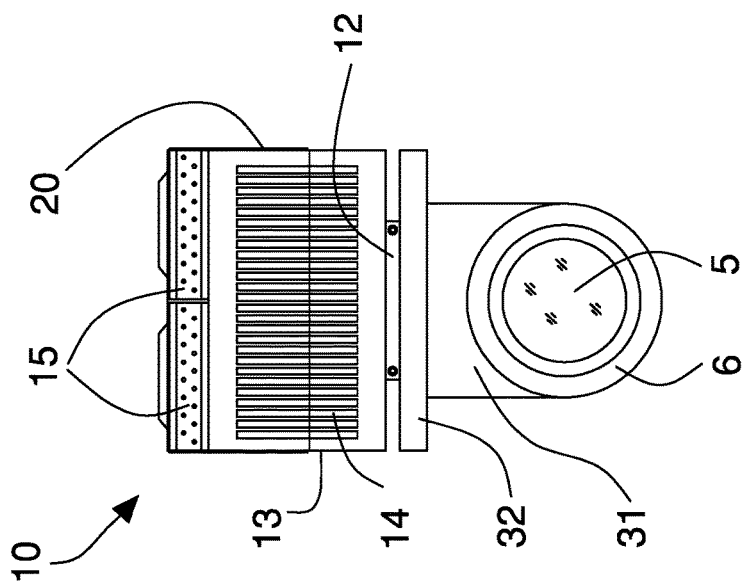
FIG. 18 is a top plan view of a variant of the cooling unit associated to focusing means and supporting means of the laser cutting head of FIG. 15.

FIG. 18 shows another variant of the laser cutting head 1 of the invention, wherein the cooling unit 10 further comprises intake means 15 arranged for introducing a cooling fluid inside said cooling ducts 14 of the heat dissipation element 13 in order to increase the heat exchange (forced convection) and to cool the hot side 12*b* of the Peltier cell more quickly and effectively. The intake means 15 includes, for instance, a couple of nozzles supplied with compressed air and capable of introducing the said expanded air in the cooling ducts 14. A diverter element 20 allows the flow of compressed air coming out from the nozzles 15 to be directed in the cooling ducts 14 so that the cooling fluid, that is the air, leaves the heat exchange element 13.

The invention claimed is:

1. Laser cutting head powered by a laser emission apparatus by an optical transmission device for use with a cutting machine tool, including:
    collimation device which collimates a laser beam emitted from said laser emission apparatus;
    a focusing device which focuses the collimated laser beam emitted from said collimation device;
    a casing for housing and containing said focusing device;
    a support connected with said focusing device and movable along an adjustment direction (X) within said casing to change a focal point of the said laser beam emitted from said focusing device;
    a cutting nozzle that is secured to said casing and through which the focused laser beam passes, said cutting nozzle concentrating a gas jet for removing molten material generated by the fusion of a workpiece that is cut by the laser beam;
    a cooling unit connected with said casing and comprising at least one Peltier cell and a heat dissipation element;
    at least one flexible thermal conductive element which connects said support to said cooling unit to extract by thermal conduction from said support and from said focusing device heat generated by said laser beam passing through said focusing device and to allow said support to move along said adjustment direction (X); and
    a cover formed of a thermal conductivity material and arranged to close an opening in said casing which provides access to said support, said at least one Peltier cell including a cold side connected with an outer wall of said cover and a hot side connected with said heat dissipation element.

2. Laser cutting head according to claim 1, wherein said focusing device comprises at least one focusing lens.

3. Laser cutting head according to claim 1, wherein said support comprises a supporting element that is contained and slides within said casing and is made of a thermal conductivity material.

4. Laser cutting unit according to claim 1, and further comprising a drive assembly connected to said support through an opening in a side wall of said casing and which displaces said support along said adjustment direction (X).

5. Laser cutting head according to claim 1, wherein said flexible thermal conductive element comprises a braided copper tape and/or graphite coated tape.

6. Laser cutting head according to claim 1, wherein said flexible thermal conductive element comprises a main portion secured to said cooling unit and from which two extended portions depart that are secured to opposite sides of said support.

7. Laser cutting head according to claim 1, wherein said thermal conductive element is fixed to an inner wall of said cover.

8. Laser cutting head according to claim 1, wherein said thermal conductive element is directly fixed to said cold side of said Peltier cell through a respective opening of said cover.

9. Laser cutting head according to claim 1, wherein said cold side of said Peltier cell is fixed to an external wall of said casing and said flexible thermal conductive element is directly fixed to said cold side of said Peltier cell through a respective opening provided in the casing.

10. Laser cutting head according to claim 1, wherein said cooling unit comprises a plurality of Peltier cells that are arranged in parallel and/or in series.

11. Laser cutting head according to claim 1, wherein said thermal conductive element is fixed to said support and to said Peltier cell by a thermal conductive adhesive.

12. Laser cutting head according to claim 1, wherein said heat dissipation element comprises a plurality of cooling ducts for the passage of air.

13. Laser cutting head according to claim 12, comprising an intake which introduces a cooling fluid into said cooling ducts.

14. Cutting and/or punching machine tool comprising at least one laser cutting head according to claim 1.

15. A laser cutting head powered by a laser emission apparatus via an optical transmission device and associable with a cutting machine tool, comprising
    (a) a collimation device to collimate a laser beam emitted from said laser emission apparatus;
    (b) a casing containing a cavity arranged adjacent to said collimation device;
    (c) a support formed of a thermal conductivity material arranged within said casing and movable along an adjustment direction;
    (d) a focusing device arranged on said support for focusing a collimated laser beam emitted from said collimation device, a focal point of said collimated laser beam being changed upon movement of said support;

(e) a cooling unit including at least one Peltier cell and a heat dissipation element;

(f) a thermal conductive connector connecting said support with said cooling unit and extracting heat generated by said laser beam from said support and from said focusing device via thermal conduction; and (g) a moving element that supports at least one of said thermal conductive connector and said cooling unit and is slidably connected with an external wall of said casing for movement along said adjustment direction to move said support and said focusing device, said thermal conductive connector including a first and second connecting elements formed of a thermal conductivity material, at least one of said second connecting element and said moving element hermetically closing an opening of said cavity.

16. A laser cutting head as defined in claim 15, wherein said first connecting element has a first end connected with said support and a second end connected with said second connecting element which is connected with said Peltier cell.

17. A laser cutting head as defined in claim 16, wherein said moving element is connected with said second connecting element.

18. A laser cutting head as defined in claim 16, wherein said moving element contains an opening permitting said first and second connecting elements to connect said support and said Peltier cell.

19. A laser cutting head as defined in claim 17, wherein said second connecting element and said moving element are integral and formed of a thermal conductivity material.

20. A laser cutting head as defined in claim 15, wherein said Peltier cell includes a cold side connected with said thermal conductive connector and a hot side connected with said heat dissipation element.

21. A laser cutting head as defined in claim 15, and further comprising a driving device connected with said casing and with said moving element to move said moving element along said adjustment direction (X).

22. A laser cutting head as defined in claim 15, wherein said focusing device includes at least one focusing lens.

23. A laser cutting head as defined in claim 15, wherein said cooling unit includes a plurality of Peltier cells that are arranged at least one of parallel and in series.

24. A laser cutting head as defined in claim 15, wherein said heat dissipation element includes a plurality of cooling ducts for the passage of air via convection.

25. A laser cutting head as defined in claim 24, wherein said heat dissipation element includes an inlet for introducing a cooling fluid into said cooling ducts.

26. A cutting and/or punching machine tool, comprising at least one laser cutting head as defined in claim 15.

* * * * *